United States Patent
Yamaura

(10) Patent No.: US 6,175,890 B1
(45) Date of Patent: *Jan. 16, 2001

(54) DEVICE FOR EFFICIENTLY HANDLING INTERRUPT REQUEST PROCESSES

(75) Inventor: Shinichi Yamaura, Kobe (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/873,307

(22) Filed: Jun. 11, 1997

(30) Foreign Application Priority Data

Jun. 12, 1996 (JP) .................................... 8-172961

(51) Int. Cl.⁷ .................................... G06F 13/32
(52) U.S. Cl. .............. 710/267; 712/244; 712/40
(58) Field of Search .................... 345/287, 309, 345/310, 856; 340/172; 714/735; 712/244; 710/40, 262, 260, 267

(56) References Cited

U.S. PATENT DOCUMENTS

| | | | |
|---|---|---|---|
| 3,665,415 | 5/1972 | Beard et al. | 340/172.5 |
| 3,676,861 | 7/1972 | Ruth | 340/172.5 |
| 4,001,783 | 1/1977 | Monahan et al. | 340/172.5 |
| 4,003,028 | 1/1977 | Bennett et al. | 340/172.5 |
| 4,004,283 | 1/1977 | Bennett et al. | |
| 4,020,472 | 4/1977 | Bennett et al. | 340/172.5 |
| 4,028,663 | 6/1977 | Royer et al. | 340/172.5 |
| 4,037,204 | 7/1977 | Bennett et al. | 364/200 |
| 4,068,305 | 1/1978 | Cutler | 364/200 |
| 4,106,091 | 8/1978 | Hepworth et al. | |
| 4,160,289 | 7/1979 | Bambara et al. | 364/200 |
| 4,205,374 | 5/1980 | Bardsley, III et al. | 364/200 |
| 4,218,739 | 8/1980 | Negi et al. | 364/200 |
| 4,245,308 | 1/1981 | Hirschman et al. | 364/200 |
| 4,358,829 | 11/1982 | Branigin et al. | 364/900 |
| 4,396,984 | 8/1983 | Videki, II | 364/200 |
| 4,420,806 | 12/1983 | Johnson, Jr. et al. | 364/200 |
| 4,422,141 | 12/1983 | Shoji | 364/200 |
| 4,517,643 | 5/1985 | Bannai . | |
| 4,545,030 | * 10/1985 | Kirchin | 364/400 |
| 4,734,882 | 3/1988 | Romagosa | 364/400 |
| 4,779,195 | 10/1988 | James | 364/200 |
| 4,803,613 | 2/1989 | Kametani et al. | 364/132 |
| 4,912,628 | 3/1990 | Briggs | 364/200 |
| 4,969,119 | 11/1990 | Kurokawa et al. | 364/400 |
| 4,975,839 | 12/1990 | Nakatsuka et al. | 364/200 |
| 4,998,197 | 3/1991 | Kurakazu et al. | 364/200 |
| 5,161,228 | 11/1992 | Yasui et al. | 395/725 |
| 5,161,229 | 11/1992 | Yasui et al. | 395/775 |
| 5,268,873 | * 12/1993 | Suzuki | 365/233.5 |
| 5,514,975 | * 5/1996 | Sartwell et al. | 324/763 |
| 5,625,777 | * 4/1997 | Takahashi et al. | 395/283 |
| 5,798,972 | * 8/1998 | Lao et al. | 365/189 |

FOREIGN PATENT DOCUMENTS 451329 2/1992 (JP) .................................... G06F/9/46

* cited by examiner

Primary Examiner—Albert De Cady
Assistant Examiner—Esaw Abraham
(74) Attorney, Agent, or Firm—Cooper & Dunham LLP

(57) ABSTRACT

When an interrupt request signal is input, a microprocessor checks, upon termination of an instruction cycle being executed, whether the interrupt request is masked. If the interrupt request is not masked, the microprocessor saves the content of the program counter and the processor status register to a stack. If an extended interrupt request signal is at a high level, the microprocessor sets the bus status signals to a unique state so that a data bus is in a high impedance state. An interrupt controller outputs mask flag data to the data bus so that the mask flag data is saved to a stack. Thereafter, the three-byte data is fetched from a vector address and stored in the program counter. When the mask flag data is to be restored, the mask flag data is read while the bus status signals are set to the unique state.

19 Claims, 7 Drawing Sheets

FIG. 3

| ST2 | ST1 | ST0 | DECIMAL REPRESENTATION | PROCESSOR STATE |
|---|---|---|---|---|
| 0 | 0 | 0 | 0 | IDLE |
| 0 | 0 | 1 | 1 | NORMAL DATA ACCESS |
| 0 | 1 | 0 | 2 | NORMAL PROGRAM ACCESS |
| 0 | 1 | 1 | 3 | EXTENDED INTERRUPTION |
| 1 | 0 | 0 | 4 | SLEEP (LOW POWER CONSUMPTION) |
| 1 | 0 | 1 | 5 | VECTOR FETCH |
| 1 | 1 | 0 | 6 | CODE FETCH AFTER BRANCH (SYNC) |
| 1 | 1 | 1 | 7 | RESERVED |

DEVICE FOR EFFICIENTLY HANDLING INTERRUPT REQUEST PROCESSES

BACKGROUND OF THE INVENTION

1. Field of the Invention

The present invention generally relates to a microprocessor capable of an interrupt process and an adaptor device coupled to such a microprocessor, and more particularly, to a microprocessor and an adaptor device efficiently handling interrupt request processes.

2. Description of the Related Art

In a system where a microprocessor is connected to a plurality of external devices, a plurality of interrupt requests for accessing the microprocessor may occur simultaneously. These requests may or may not be accepted depending on how the microprocessor is executing a current process.

Acceptance of requests is controlled by an interruption mask flag (hereinafter, simply referred to as a mask flag) set in a mask register usually provided in the microprocessor. For example, an interruption is enabled when the mask flag is set to 0 and is disabled when the mask flag is set to 1. Hereinafter, a "mask level state" will refer to a status of a microprocessor process characterized by a unique set of mask flags.

The number of mask flags available depends on the architecture of the microprocessor. If the number of interrupt requests exceeds the number of the mask flags, it is impossible to enable or disable interrupt requests on an independent basis.

A first conceivable approach to resolve this disadvantage is to increase the number of mask registers. If such an approach is introduced in a system where relatively few interrupt requests occur, many of the registers provided may seldom be necessary. It is also to be noted that mask flags should essentially be saved before the control is turned to an interrupt process because otherwise it is impossible to return to an original mask level state after an interrupt process is completed. According to the first conceivable approach, it is necessary to save the content of a large number of mask registers to a stack when an interrupt request is acknowledged and restore the saved mask register contents when the control is returned to a normal process from the interrupt process. Thus, if a system does not require a large number of mask flags, the first conceivable approach would prove disadvantageous since it slows down the interrupt process and causes a large portion of the memory allocated to the stack to be consumed.

In an alternative approach, mask flags could be provided outside the microprocessor. More specifically, mask flags may be provided in a register of an adaptor device coupled to the microprocessor when the internal registers of the microprocessor can no longer accommodate a satisfactory number of mask flags or mask levels. For example, Japanese Laid-Open Patent Application No. 4-51329 discloses a technology where the content (context) of a register built into a coprocessor (an adaptor device) preceding the interruption is compared to that subsequent to the interruption, whereupon the context of the coprocessor is saved to a stack only when it is found that the CPU is assigned to a task requiring the use of the coprocessor. In this approach, the CPU reads the context from the coprocessor and writes the same to the stack. In other words, the CPU performs a stack write operation.

If an adaptor device external to the microprocessor is provided with a mask register, saving of that mask register content in an event of an interruption and restoring of the mask register content upon a return from the interrupt process are executed by software (interrupt process program) according to the related art.

Therefore, any approach whereby mask flags are merely provided in an adaptor device has a disadvantage in that the processing time increases. This disadvantage is particularly noticeable in a system in which multiple interruptions are enabled. In such a system, a second interrupt request occurring subsequent to a first interrupt request has to wait until the first interrupt request is accepted and the mask register content is saved. Since it takes time for software to save the mask register content upon the acceptance of the first interrupt request, the second interrupt request has to wait a certain period of time before it is accepted.

A conceivable approach whereby the mask register content is saved in hardware outside the microprocessor requires the use of relatively large-scale hardware including an address generating circuit for generating an address at which the mask register content is saved. Therefore, such an approach tends to increase the cost of a system involving the microprocessor.

SUMMARY OF THE INVENTION

Accordingly, a general object of the present invention is to provide a microprocessor and an adaptor device in which the aforementioned disadvantages are eliminated.

Another and more specific object of the present invention is to provide a microprocessor and an adaptor device in which data provided in the adaptor device is efficiently saved to a stack in an interrupt process and the data thus saved is efficiently restored when the control is returned to a normal process.

The aforementioned objects of the present invention can be achieved by a microprocessor capable of interrupt process, comprising: input means for receiving a signal requesting a unique write bus cycle in which the microprocessor does not provide data to a data bus connected to the microprocessor; saving means for saving a program counter content and a processor status register content to a stack; and write bus cycle generating means for generating, when an interrupt request occurs and when the input means receives the signal, the unique write bus cycle for writing to the stack, by putting the data bus to a high-impedance status and by introducing a unique bus status different from a bus status in which a normal program-driven stack write from the microprocessor to a memory occurs.

According to the microprocessor of the present invention, data provided in the adaptor device is efficiently saved in an interrupt process to a stack provided in a memory.

The aforementioned objects could also be achieved by a microprocessor capable of interrupt process comprising: input means for receiving a signal requesting a unique read bus cycle in which the microprocessor neglects data on a data bus connected to the microprocessor; read bus cycle generating means for generating a normal read bus cycle in which a normal stack read from a memory to the microprocessor occurs, and for generating, in accordance with an interrupt process program, the unique read bus cycle for reading from a stack, by introducing a unique bus status different from a bus status in which a normal stack read from a memory to the microprocessor occurs; and returning means for returning from the interrupt process program by restoring a program counter and a processor status register on the normal read bus cycle.

According to this aspect of the invention, data in the adaptor device coupled to the microprocessor is efficiently restored from a stack when the control is returned from an interrupt process to a normal process.

The aforementioned objects could also be achieved by an adaptor device connected to a microprocessor via a data bus, the microprocessor comprising: input means for receiving a signal requesting a unique write bus cycle in which the microprocessor does not provide data to the data bus connected to the microprocessor and a unique read bus cycle in which the microprocessor neglects data on a data bus connected to the microprocessor; saving means for saving a program counter content and a processor status register content to a stack; write bus cycle generating means for generating, when an interrupt request occurs and when the input means receives the signal, the unique bus cycle for writing to the stack, by putting the data bus to a high-impedance status and by introducing a unique bus status different from a status in which a normal program-driven stack write from the microprocessor to a memory occurs; read bus cycle generating means for generating a normal read bus cycle in which a normal stack read from a memory to the microprocessor occurs, and for generating, in accordance with an interrupt process program, a unique read bus cycle for reading from a stack, by introducing a unique bus status different from a status in which a normal stack read from a memory to the microprocessor occurs; and returning means for returning from the interrupt process program by restoring the program counter and the processor status register on the normal read bus cycle; wherein the adaptor device stores data that occurs in the data bus to an internal register during the unique read bus cycle and outputs data in the internal register to the data bus during the unique write bus cycle.

According to adapter device of the present invention, data stored in an internal register of the adaptor device is saved in a stack in an interrupt process and the data saved in the stack is restored in the internal register of the adaptor device when the control is returned from the interrupt process to the normal process.

The internal register may hold mask flag data for masking an interrupt request from peripheral devices requiring an interruption.

According to this aspect of the present invention, saving of the mask flag data held in the internal register of the adaptor device to a stack and restoring of the mask flag data held in the stack to the internal register of the adaptor device are executed automatically without resorting to software.

The microprocessor could also comprise normal write bus cycle generating means for generating, when an interrupt request occurs and when the input means does not receive the signal, a normal write bus cycle for writing to the data bus, by introducing a bus status in which a normal stack write occurs.

According to this aspect of the present invention, an unnecessary saving operation can be omitted when it is not necessary to save data from the adaptor device. Thus, the processing time is reduced and the stack area can be efficiently used.

The microprocessor may comprise: first executing means for executing a first return instruction which causes the read bus generating means to generate the unique read bus cycle in addition to the normal read bus cycle; and second executing means for executing a second return instruction which causes the read bus generating means to generate the normal read bus cycle.

According to this aspect of the present invention, an unnecessary returning operation is omitted when it is not necessary to return the adaptor device data. Thus, the processing time is reduced and the stack area can be efficiently used.

The write bus cycle generating means may repeatedly generate the unique write bus cycle while the signal is being input to the input means.

According to this aspect of the present invention, it is possible to save the entirety of a large volume of data to a stack.

The read bus cycle generating means may repeatedly generate the unique read bus cycle while the signal is being input to the input means.

According to this aspect of the present invention, it is possible to save the entirety of a large volume of data to be returned from the stack.

BRIEF DESCRIPTION OF THE DRAWINGS

Other objects and further features of the present invention will be apparent from the following detailed description when read in conjunction with the accompanying drawings, in which:

FIG. 3 is a table showing correspondence between bus status signals and microprocessor statuses according to the first embodiment;

DESCRIPTION OF THE PREFERRED EMBODIMENTS

Figure 1:
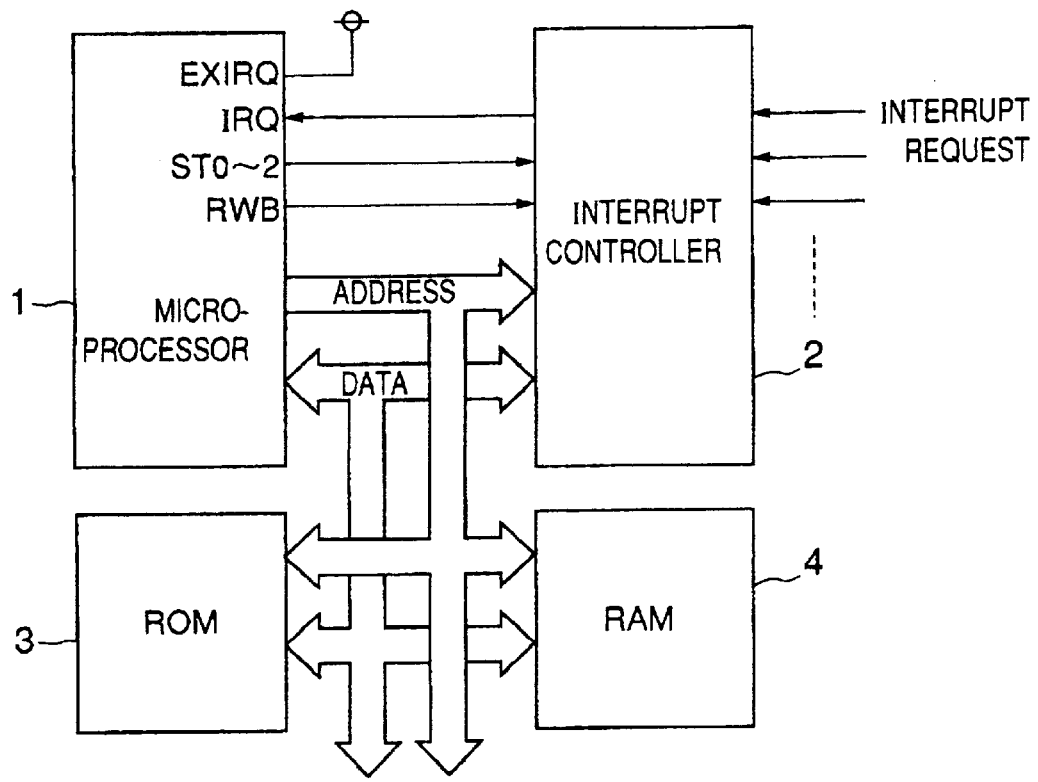
FIG. 1 is a block diagram of a system including a microprocessor according to a first embodiment of the present invention.
Figure 2:
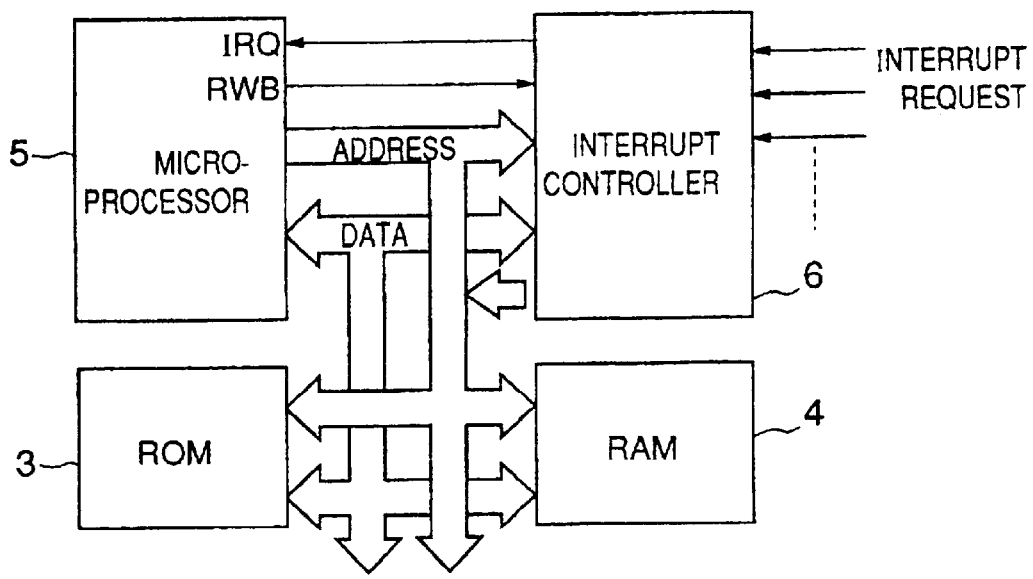
FIG. 2 is a block diagram of a system including a microprocessor according to the related art.

FIG. 1 is a block diagram of a system including a microprocessor according to a first embodiment of the present invention. FIG. 2 is a block diagram of a system including a microprocessor according to the related art.

Referring to FIG. 2, in a system in which a larger number of interrupt requests than that acceptable to a microprocessor are required, an interrupt controller 6 is provided as an adaptor device coupled to a microprocessor 5 in order to enable multiple interrupt requests. In such a system, an interrupt request IRQ is input to the microprocessor 5 via the interrupt controller 6. The microprocessor 5 operates in accordance with a program stored in a ROM 3, using a RAM 4 as a work space. Upon detection of the interrupt request IRQ, the microprocessor 5 determines whether the interrupt request IRQ is enabled. If it is determined that the interrupt request IRQ is enabled, the microprocessor 5 executes an interrupt process immediately when a current instruction cycle ends. A mask flag for disabling (masking) each one of individual interrupt requests is provided in an internal register of the interrupt controller 6. In order to adapt for multiple interrupt requests, the mask flags should be saved to a stack managed by the microprocessor 5 when the interrupt request occurs.

A description will now be given of a system according to a first embodiment of the present invention. Referring to FIG. 1, a microprocessor 1 is provided with an input terminal for receiving an interrupt request IRQ, an input terminal for receiving an extended interrupt request signal EXIRQ, output terminals for supplying bus status signals ST0, ST1 and ST2, and an output terminal for supplying a RWB signal. The EXIRQ signal at a high level specifies that the interrupt process according to the present invention should be executed. The EXIRQ signal is fed by an external device (not shown). The bus status signals ST0, ST1 and ST2, and the RWB signal are fed by the microprocessor 1 to the interrupt controller 2. FIG. 3 shows correspondence between the bus status signals ST0, ST1 and ST2 and the status (processor status) of the microprocessor 1.

Figure 4:
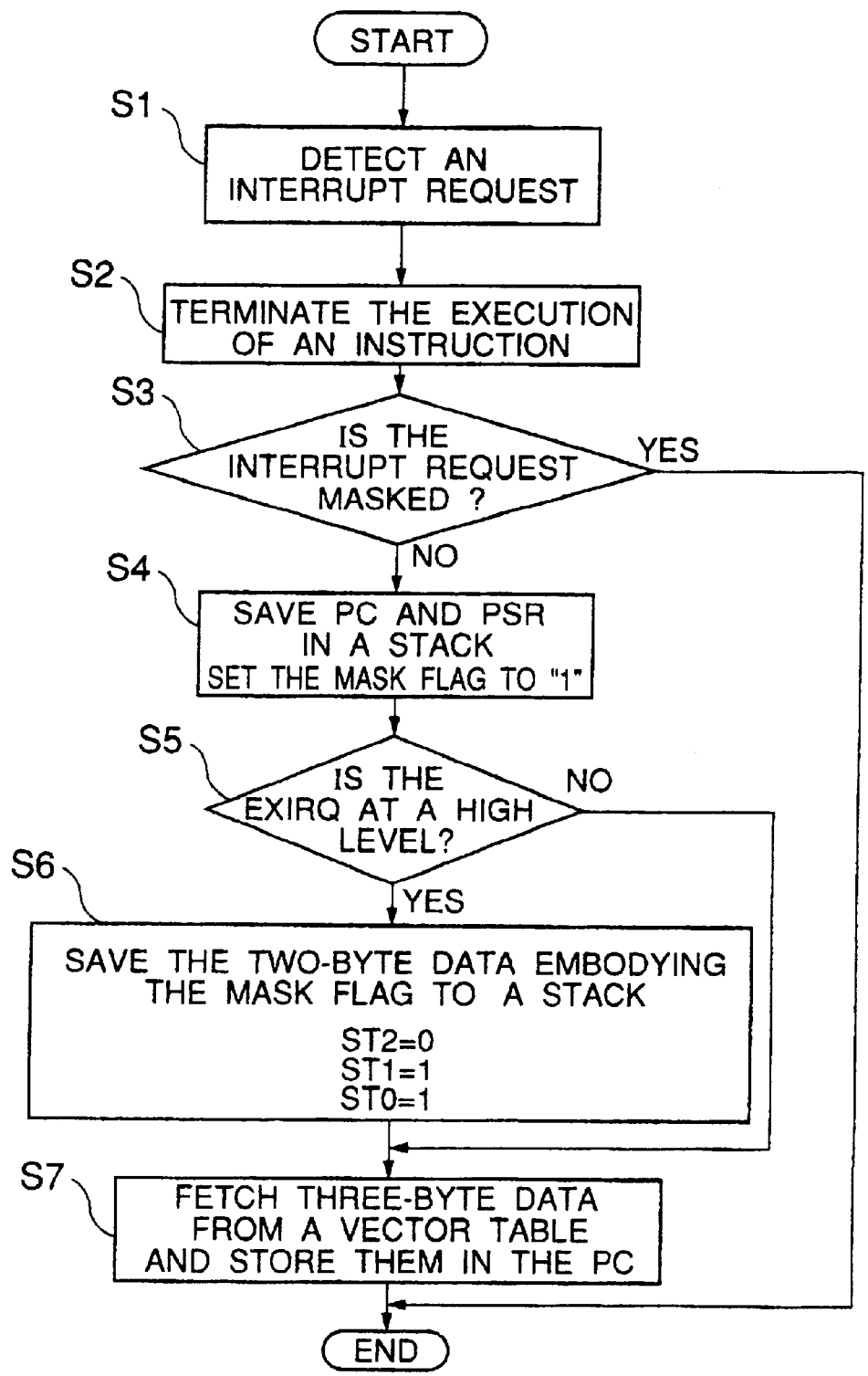
FIG. 4 is a flowchart of a mask flag saving operation and an interrupt process in the microprocessor according to the first embodiment.
Figure 5:
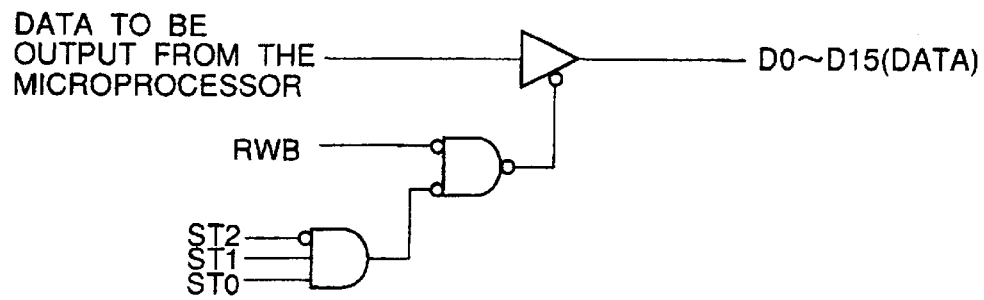
FIG. 5 shows an equivalent circuit showing a logic used by the microprocessor according to the first embodiment.

FIG. 4 is a flowchart of a mask flag saving operation in the microprocessor 1. The interrupt request IRQ is input to the microprocessor 1 at step S1. Immediately when the current instruction cycle ends (step S2), the microprocessor 1 checks whether the interrupt request IRQ is masked (step S3). If it is determined that the interrupt request IRQ is masked (YES in step S3), the operation is terminated. If it is determined that the interrupt request IRQ is not masked (NO in step S3), the microprocessor 1 saves the content of a program counter PC and a processor status register PSR (see FIG. 3) to a stack. The microprocessor 1 then sets the mask flag to "1" (step S4) and checks whether the extended interrupt request EXIRQ is at a high level or a low level (step S5). If the extended interrupt request EXIRQ is at a high level (YES in step S5), the microprocessor 1 changes the bus status from a normal stack write status (ST2="0", ST1="0", ST0="1") to a new status (ST2="0", ST1="1", ST0="1") and saves two-byte mask flag data to the stack (step S6). By setting the bus status signals such that ST2="0", ST1="0", ST0="1" and by setting the RWB signal to a low level to indicate the stack write operation, the microprocessor 1 puts the data bus to a high-impedance status in accordance with a logic shown in the equivalent circuit of FIG. 5. When the data bus is set to a high-impedance state, data is prevented from being output from the microprocessor to the data bus.

Figure 6:
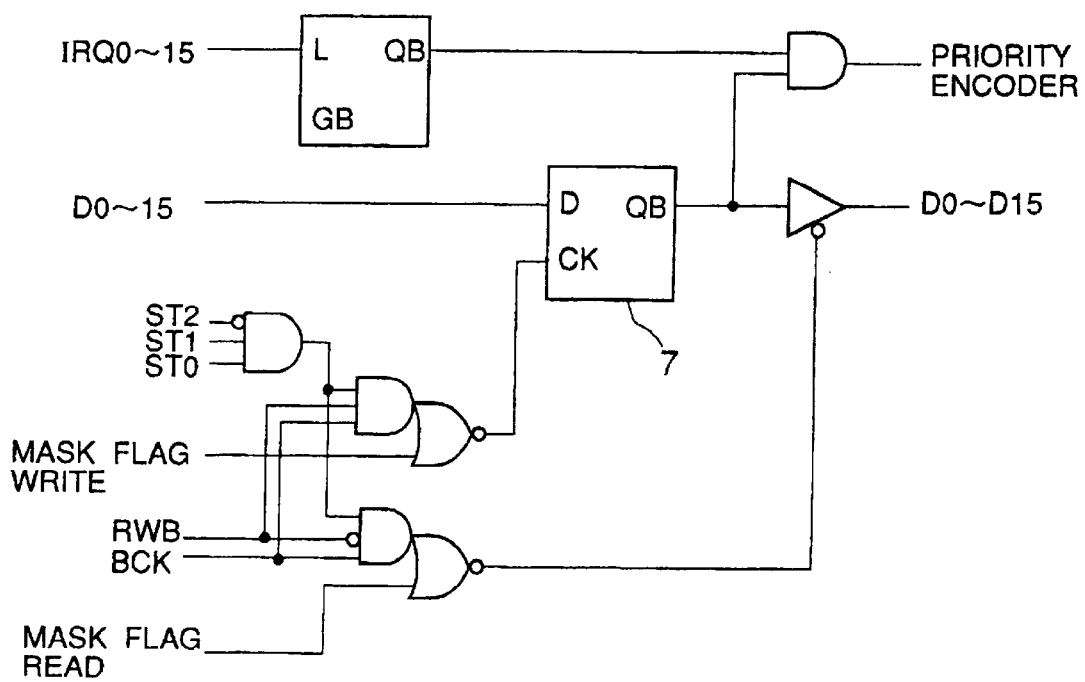
FIG. 6 shows an equivalent circuit showing a logic used by the microprocessor according to the first embodiment and involving an interrupt controller embodying the adaptor device according to the first embodiment.

FIG. 6 shows an equivalent circuit illustrating the operation in the interrupt controller 2. An internal register 7 is provided in the interrupt controller 2 to hold the mask flag. A mask flag write signal is at a high level when the interrupt controller 2 receives from the microprocessor an address of the internal register 7 to write the mask flag data thereto. A mask flag read signal is at a high level when the interrupt controller 2 receives from the microprocessor an address of the internal register 7 to read the mask flat data therefrom. While the bus status signals are such that ST2="0", ST1= "1", ST0="1" and the mask flag read signal is at a high level, the interrupt controller 2 outputs the mask flag data held in the internal register 7 to the data bus in accordance with a logic indicated by the equivalent circuit. While only one internal register 7 is shown, there could be a plurality of internal registers in the interrupt controller 2.

The microprocessor then fetches three bit data from a vector table and stores the same to the program counter PC (step S7). Then, the microprocessor process is terminated. When the extended interrupt request EXIRQ is at a low level (NO in step S5), step 6 is not executed and the operation proceeds to step S7.

Figure 7:
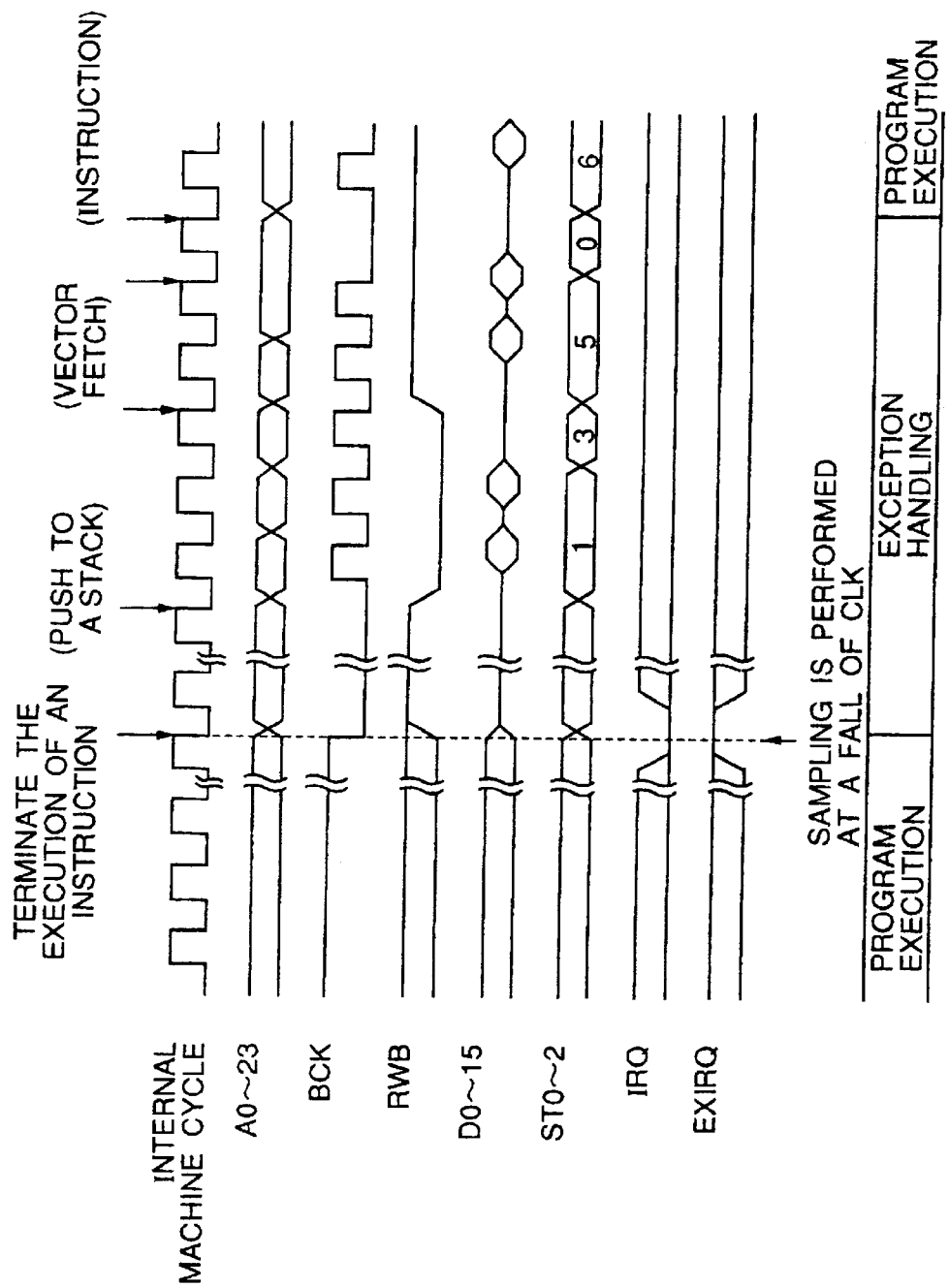
FIG. 7 is a timing chart in an extended interrupt process.
Figure 8:
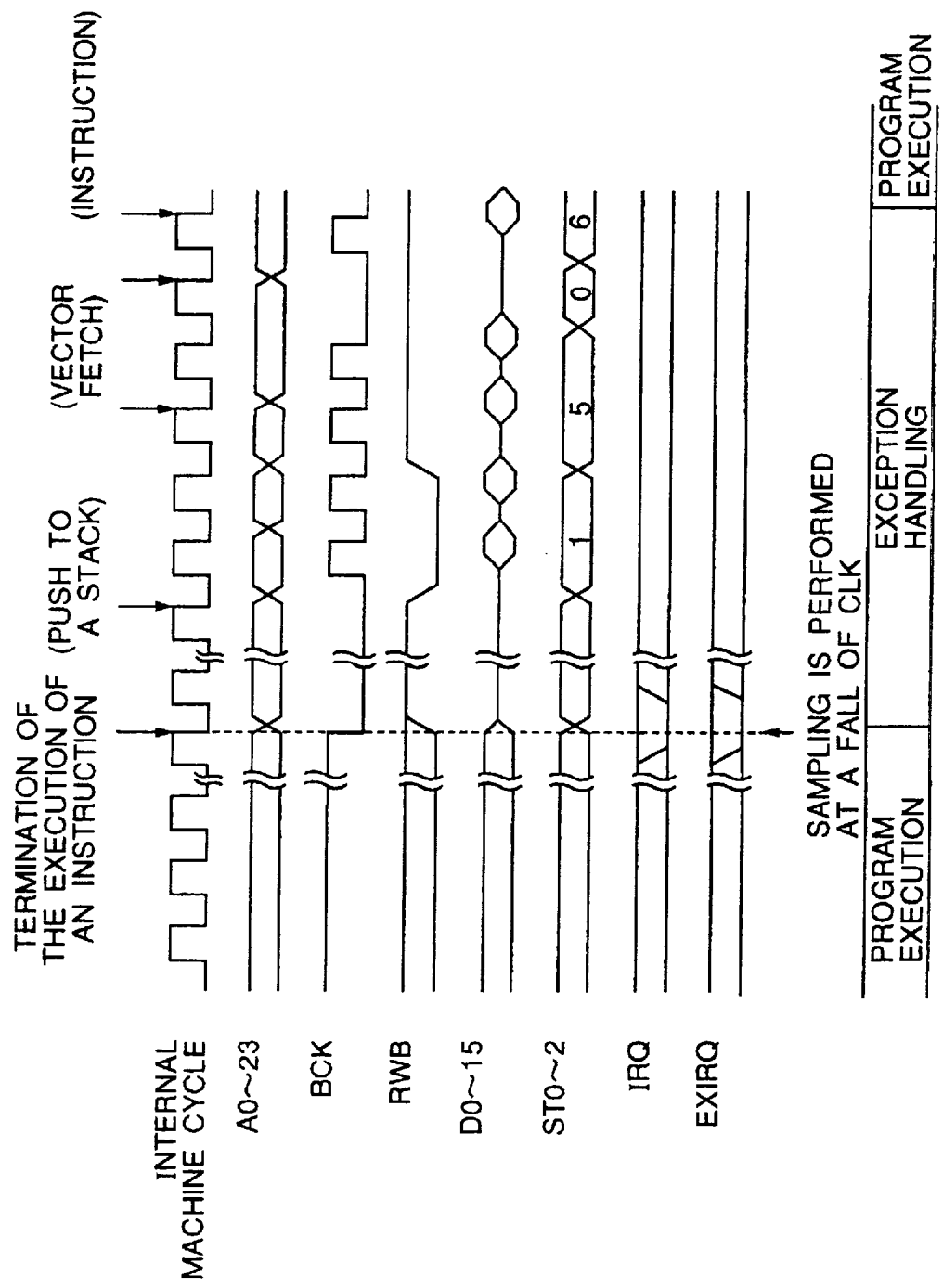
FIG. 8 is a timing chart in a interrupt process according to the related art.

FIG. 7 is a timechart showing an extended interrupt process occurring when the extended interrupt request EXIRQ is at a high level. FIG. 8 is a timechart showing a normal interrupt process occurring when the extended interrupt request EXIRQ is at a low level.

Comparing FIG. 7 with FIG. 8, it will be noted that the extended interrupt process shown in FIG. 7 ensures that, upon a detection of a high level of the extended interrupt request EXIRQ, the bus status indicated by a decimal representation of 3 is introduced in the data bus, allowing the mask flag data in the internal register 7 of the interrupt controller to be saved to a stack.

Figure 9:
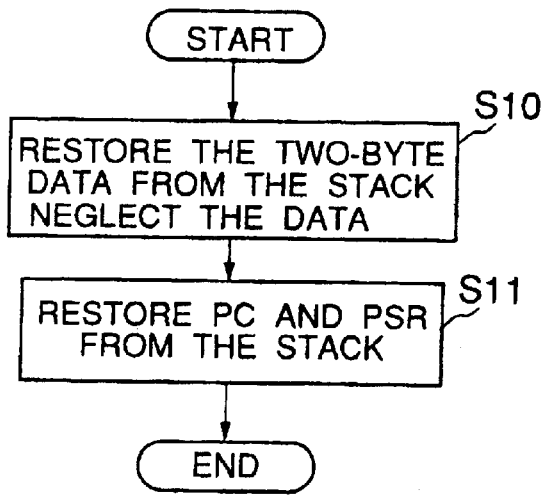
FIG. 9 is a flowchart showing a mask flag restoration operation and a returning from a unique interrupt program in the microprocessor according to the first embodiment.

FIG. 9 is a time chart showing mask flag restoration executed by the microprocessor 1. The microprocessor 1 is capable of executing a normal return instruction for returning from a normal interrupt process and an extended return instruction for returning from an extended interrupt process. When the extended return instruction is acknowledged by the microprocessor, the bus status signals are set such that ST2="0", ST1="1", ST0="1" and the RWB signal is set to a high level to read the two-byte mask flag data from the stack. However, the microprocessor 1 does not receive the mask flag data thus read. The interrupt controller 2 loads (restores) the mask flag from the stack via the data bus into the internal register 7 for holding the mask flag, in accordance with a logic illustrated by the equivalent circuit of FIG. 6 (step S10). More specifically, the status signals ST2="0", ST1="1", ST0="1" concur with the high level of the RWB signal indicating a write to the internal register 7, so that the mask flag data carried on the data bus is restored in the internal register 7.

The microprocessor 1 then restores the content of the program counter PC and the processor status register PSR and returns to the state preceding the interruption (step S11).

A description will now be given of a second embodiment of the present invention.

Figure 10:
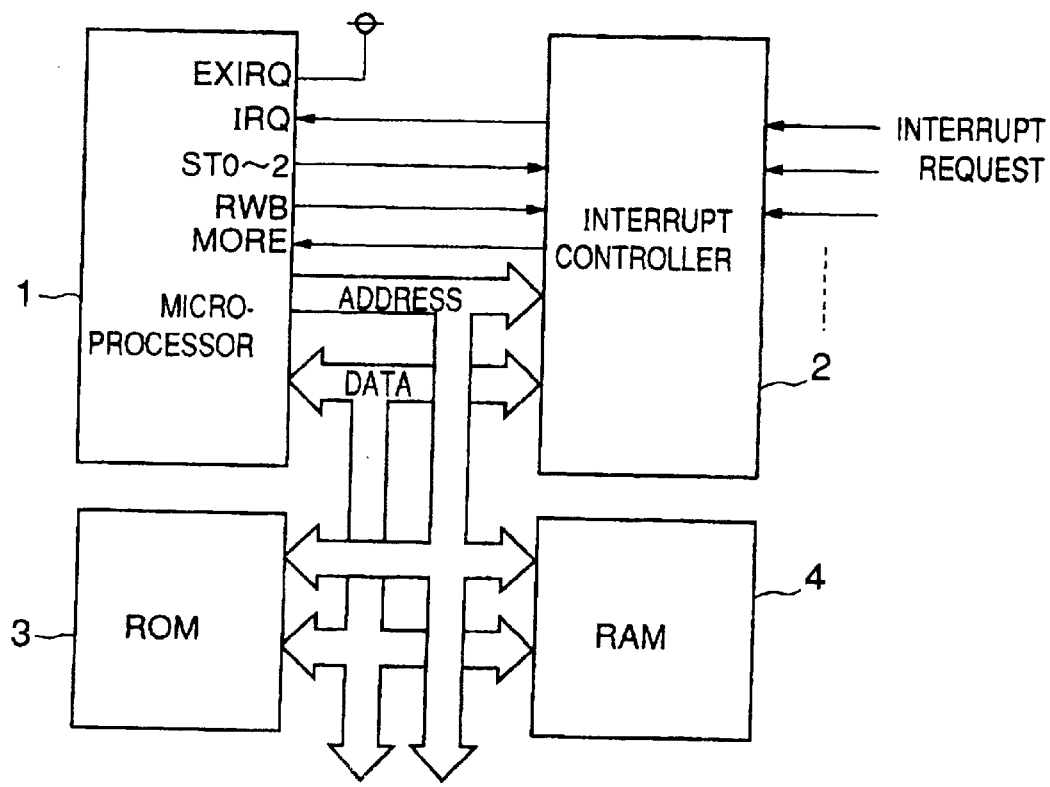
FIG. 10 is a block diagram of a system including a microprocessor according to a second embodiment of the present invention.

It is assumed that two-byte mask flag data is saved and restored in the first embodiment described above. The mask flag comprising more than two bytes of data may be held in the interrupt controller connected to a 16-bit bus, for example. Irrespective of the data bus size, all of the bytes constituting the mask flag should of course be saved. If the mask flag data size exceeds the data bus size, an input terminal for receiving a continue request signal MORE could be added to the microprocessor 1 and connected to the interrupt controller 2, as shown in FIG. 10. In the extended interrupt process occurring when the extended interrupt request EXIRQ is at a high level, the bus cycle specified by the bus status signals ST2="0", ST1="1", ST0="1" continues to be generated as long as the continue request signal MORE is at a high level. As long as the continue request signal MORE is maintained at a high level, the two-byte mask flag data continues to be saved to the stack, thus enabling saving of the mask flag data longer than two bytes. Restoring of the mask flag data longer than two bytes is also possible by maintaining the continue request signal MORE at a high level and repeatedly reading the mask flag data from the stack.

It is to be noted that there are other types of data than the mask flag data that should be saved in the interrupt process. It is to be appreciated that the present invention could also be applied to saving and restoring of such types of data.

The present invention is not limited to the above described embodiments, and variations and modifications may be made without departing from the scope of the present invention.

What is claimed is:

1. A device for handling an interrupt process, comprising:

bus status signal means for outputting from a microprocessor bus status signals;

input means connected to the microprocessor and including a first input for receiving an interrupt request and a second input for receiving an extended interrupt request signal requesting a unique write bus cycle, the microprocessor preventing data from being supplied to a data bus connected to the microprocessor during the unique write bus cycle by setting the data bus to a high-impedance state in response to a predetermined bus status signal;

saving means for saving program counter data and processor status register data to a stack of the saving means; and write bus cycle generating means for generating the unique write bus cycle for writing to the stack when the interrupt request occurs and when the input means receives the extended interrupt request signal requesting the unique write bus cycle by setting the data bus to the high-impedance state and by establishing a unique write bus state.

2. The device as recited in claim 1, further comprising:

normal write bus cycle generating means for generating a normal write bus cycle for writing to the data bus when the interrupt request occurs and when the input means does not receive the signal requesting a unique write bus cycle by establishing a normal write bus state for which a normal stack-write operation occurs.

3. The device as recited in claim 1, wherein the write bus cycle generating means repeatedly generates the unique write bus cycle while the signal is being input to the input means.

4. A device for handling an interrupt process, comprising:

bus status signal means for outputting from a microprocessor bus status signals;

input means connected to the microprocessor and including first input means for receiving an interrupt request and a second input means for receiving an extended interrupt request, the microprocessor preventing data from being supplied to a data bus connected to the microprocessor by setting the data bus to a high-impedance state in response to a predetermined bus status signal;

read bus cycle generating means for generating in accordance with an interrupt request a normal read bus cycle in which a stack is normally read and stored to a first storage, and for generating, in accordance with the extended interrupt request, a unique read bus cycle in which data from the microprocessor is prevented from being supplied to the data bus connected to the microprocessor by establishing a unique read bus state and the stack is read and stored to a second storage different from the first storage; and returning means for returning from the interrupt process by restoring a program counter and a processor status register to the normal read bus cycle.

5. The device as recited in claim 4, further comprising:

first executing means for executing a first return instruction for causing the read bus cycle generating means to generate the unique read bus cycle; and second executing means for executing a second return instruction for causing the read bus cycle generating means to generate the normal read bus cycle.

6. An apparatus for handling interrupt request processes, comprising:

bus status signal means for outputting from a microprocessor bus status signals;

input means connected to the microprocessor and including a first input for receiving an interrupt request and a second input for receiving an extended interrupt request signal requesting a unique write bus cycle, the microprocessor preventing data from being supplied to a data bus connected to the microprocessor by setting the data bus to a high-impedance state in response to a predetermined bus status signal;

saving means connected to the date bus for saving program counter data and processor status register data to a stack of the saying means;

write bus cycle generating means for generating the unique write bus cycle for writing to the stack when the interrupt request occurs and when the input means receives the extended interrupt request signal requesting a unique write bus cycle by setting the data bus to the high-impedance state and by establishing a unique write bus state;

read bus cycle generating means for generating a normal read bus cycle in which the stack is normally read and stored to a first storage of the microprocessor, and for generating, in accordance with an extended interrupt request process, a unique read bus cycle in which data from the microprocessor is prevented from being supplied to the data bus connected to the microprocessor by establishing a unique read bus state and the stack is read and stored to a second storage different from the first storage;

returning means for returning from the interrupt process by restoring the program counter and the processor status register to the normal read bus cycle; and an adaptor device connected to the microprocessor and including the second storage for storing the stack during the unique read bus cycle and for outputting the data in the second storage to the data bus during the unique write bus cycle.

7. The apparatus as recited in claim 6, wherein the internal register of the adaptor device holds mask flag data for masking interrupt requests from peripheral devices when the internal register receives a signal output from the microprocessor.

8. The apparatus as recited in claim 6, wherein the read bus cycle generating means repeatedly generates the unique read bus cycle while the signal is being input to the input means.

9. A device for handling an interrupt process, comprising:

a bus status signal generator for outputting from a microprocessor bus status signals;

input terminals connected to the microprocessor including a first input terminal for receiving an interrupt request and a second input terminal for receiving an extended interrupt request signal requesting a unique write bus cycle, the microprocessor preventing data from being supplied to a data bus connected to the input terminal by setting the data bus to a high-impedance state in response to a predetermined bus status signal;

a memory for storing program counter data and processor status register data to a stack of the memory; and a write bus cycle generator for generating the unique write bus cycle for writing to the stack when the interrupt request occurs and when the input terminal receives the extended interrupt request signal requesting the unique write bus cycle by setting the data bus to the high-impedance state and by establishing a unique write bus state.

10. The device as recited in claim 9, further comprising:
a normal write bus cycle generator for generating a normal write bus cycle for writing to the data bus when the interrupt request occurs and when the input terminal does not receive the signal requesting a unique write bus cycle by establishing a normal write bus state for which a normal stack-write operation occurs.

11. The device as recited in claim 9, wherein the write bus cycle generator repeatedly generates the unique write bus cycle while the signal is being input to the input terminal.

12. A device for handling an interrupt process, comprising:
a bus status signal generator for outputting from a microprocessor bus status signals;
inputs connected to the microprocessor and including a first input for receiving an interrupt request and a second input for receiving an extended interrupt request, the microprocessor preventing data from being supplied to a data bus connected to the microprocessor by setting the data bus to a high-impedance state in response to a predetermined bus status signal;
a read bus cycle generator for generating in accordance with an interrupt request a normal read bus cycle in which a stack is normally read and stored to a first storage, and for generating, in accordance with the extended interrupt request, a unique read bus cycle in which data from the microprocessor is prevented from being supplied to the data bus connected to the microprocessor by establishing a unique read bus state and the stack is read and stored to a second storage different from the first storage; and
a restorer for returning from the interrupt process by restoring a program counter and a processor status register to the normal read bus cycle.

13. The device as recited in claim 12, further comprising:
a first execution device for executing a first return instruction for causing the read bus cycle generator to generate the unique read bus cycle; and
a second execution device for executing a second return instruction for causing the read bus cycle generator to generate the normal read bus cycle.

14. An apparatus for handling interrupt request processes, comprising:
input terminals connected to a microprocessor and including a first input terminal for receiving an interrupt request and a second input terminal for receiving an extended interrupt request signal requesting a unique write bus cycle, the microprocessor preventing data from being supplied to a data bus connected to the microprocessor by setting the data bus to a high-impedance state in response to a predetermined bus status signal;
a memory connected to the data bus for storing program counter data and processor status register data to a stack of the memory;
a bus status signal generator for outputting from the microprocessor bus status signals;
a write bus cycle generator for generating the unique write bus cycle for writing to the stack when the interrupt request occurs and when the input terminal receives the extended interrupt request signal requesting the unique write bus cycle by setting the data bus to the high-impedance state and by establishing a unique write bus state in response to a predetermined bus status signal;
a read bus cycle generator for generating a normal read bus cycle in which the stack is normally read and stored to a first storage of the microprocessor, and for generating a unique read bus cycle in which data from the microprocessor is prevented from being supplied to the data bus connected to the microprocessor by establishing a unique read bus state and the stack is read and stored to a second storage different from the first storage;
a restorer for returning from the interrupt process by restoring the program counter and the processor status register to the normal read bus cycle; and
an interrupt controller including the second storage for storing the stack during the unique read bus cycle and for outputting the data in the second storage to the data bus during the unique write bus cycle.

15. The apparatus as recited in claim 14, wherein the internal register of the interrupt controller holds mask flag data for masking interrupt requests from peripheral devices when the interrupt controller receives a signal output from the microprocessor.

16. The apparatus as recited in claim 14, wherein the read bus cycle generator repeatedly generates the unique read bus cycle while the signal is being input to the input terminal.

17. A method of handling an interrupt process, comprising:
outputting from a microprocessor bus status signals;
receiving an interrupt request and an extended interrupt request signal requesting a unique write bus cycle, the microprocessor preventing data from being supplied to a data bus connected to the input terminal by setting the data bus to a high-impedance state in response to a predetermined bus status signal;
storing program counter data and processor status register data to a stack of a memory; and
generating the unique write bus cycle for writing to the stack when the interrupt request occurs and when the extended interrupt request signal is received requesting the unique write bus cycle by setting the data bus to the high-impedance state and by establishing a unique write bus state.

18. A method of handling an interrupt process, comprising:
outputting from a microprocessor bus status signals;
receiving an interrupt request and an extended interrupt request, the microprocessor preventing data from being supplied to a data bus connected to the microprocessor by setting the data bus to a high-impedance state in response to a predetermined bus status signal;
generating in accordance with the interrupt request a normal read bus cycle in which a stack is normally read and stored to a first storage, and generating, in accordance with the extended interrupt request, a unique read bus cycle in which data from the microprocessor is prevented from being supplied to the data bus connected to the microprocessor by establishing a unique read bus state and reading the stack and storing the read stack to a second storage different from the first storage; and
returning from the interrupt process by restoring a program counter and a processor status register to the normal read bus cycle.

19. An apparatus for handling interrupt request processes, comprising:

inputting to a microprocessor an interrupt request and an extended interrupt request requesting a unique write bus cycle, the microprocessor preventing data from being supplied to a data bus connected to the microprocessor by setting the data bus to a high-impedance state in response to a predetermined bus status signal;

storing program counter data and processor status register data to a stack of a memory;

outputting from the microprocessor bus status signals;

generating the unique write bus cycle for writing to the stack when the interrupt request occurs and when the input terminal receives the extended interrupt request requesting the unique write bus cycle by setting the data bus to the high-impedance state and by establishing a unique write bus state in response to a predetermined bus status signal;

generating in accordance with the interrupt request a normal read bus cycle in which the stack is normally read and stored to a first storage of the microprocessor, and for generating in accordance with the extended interrupt request a unique read bus cycle in which data from the microprocessor is prevented from being supplied to the data bus connected to the microprocessor by establishing a unique read bus state and the stack is read and stored to a second storage different from the first storage;

returning from the interrupt process by restoring the program counter and the processor status register to the normal read bus cycle; and storing to the second storage the stack during the unique read bus cycle and outputting the data in the second storage to the data bus during the unique write bus cycle.

* * * * *